US011887470B2

(12) United States Patent
Kitazawa

(10) Patent No.: US 11,887,470 B2
(45) Date of Patent: Jan. 30, 2024

(54) RADIO CONTROL TRANSMITTER

(71) Applicant: FUTABA CORPORATION, Mobara (JP)

(72) Inventor: Hideo Kitazawa, Mobara (JP)

(73) Assignee: FUTABA CORPORATION, Mobara (JP)

( * ) Notice: Subject to any disclaimer, the term of this patent is extended or adjusted under 35 U.S.C. 154(b) by 0 days.

(21) Appl. No.: 17/730,650

(22) Filed: Apr. 27, 2022

(65) Prior Publication Data

US 2022/0351609 A1 Nov. 3, 2022

(30) Foreign Application Priority Data

Apr. 28, 2021 (JP) ................................. 2021-075974

(51) Int. Cl.
*G08C 17/02* (2006.01)

(52) U.S. Cl.
CPC .................................... *G08C 17/02* (2013.01)

(58) Field of Classification Search
CPC . G08C 17/02; H04B 1/04; H04B 1/59; H04B 1/44; H04B 1/3888; A63H 30/04
See application file for complete search history.

(56) References Cited

U.S. PATENT DOCUMENTS 5,989,123 A * 11/1999 Tosaki .................. A63F 13/803 463/47
5,995,104 A * 11/1999 Kataoka ................ G06F 3/0338 715/848
6,192,771 B1 * 2/2001 Gouselis ................ B60K 20/04 74/471 XY
7,029,363 B2 * 4/2006 Ogihara ................. A63H 17/36 446/454
8,089,389 B2 * 1/2012 McRae .................. G08C 17/00 341/173
8,322,239 B2 * 12/2012 Isono ....................... G05G 5/03 74/10.41
8,845,386 B2 * 9/2014 Kondo ................... A63H 30/04 446/454
9,836,954 B2 * 12/2017 Takayasu ................. H04B 1/04
2002/0196174 A1 * 12/2002 Lai ....................... H01H 9/0235 446/454
(Continued)

FOREIGN PATENT DOCUMENTS

JP 2007307242 A * 11/2007
JP 2015213660 A * 12/2015

*Primary Examiner* — Adnan Aziz
(74) *Attorney, Agent, or Firm* — BACON & THOMAS, PLLC

(57) ABSTRACT

There is provided a radio control transmitter comprising: a grip portion gripped by an operator at the time of performing remote control of a control target; a base portion disposed at one end of the grip portion; a head portion disposed at the other end of the grip portion and having an operating member configured to control the control target, wherein the radio control transmitter is configured to transmit a control signal to the control target in response to an operation of the operating member; and a switch mechanism including an operating member provided as a part of a surface of the base portion and at least one switch built in the base portion and configured to activate a pre-assigned function when the operating member is pressed.

3 Claims, 6 Drawing Sheets

(56) References Cited

U.S. PATENT DOCUMENTS

| | | | | |
|---|---|---|---|---|
| 2003/0214428 | A1* | 11/2003 | Tokita | A63H 30/04 341/176 |
| 2005/0168373 | A1* | 8/2005 | Mukaida | A63H 30/04 341/176 |
| 2006/0238505 | A1* | 10/2006 | Ahlgren | G06F 3/0338 345/161 |
| 2011/0003526 | A1* | 1/2011 | Mathieu | A63H 30/04 446/34 |
| 2015/0370256 | A1* | 12/2015 | Erhart | G05D 1/0808 701/2 |
| 2016/0361639 | A1* | 12/2016 | Schmitz | A63F 13/24 |
| 2017/0151494 | A1* | 6/2017 | Ironmonger | H01H 21/24 |
| 2020/0001710 | A1* | 1/2020 | Taira | G05G 1/06 |

* cited by examiner

RADIO CONTROL TRANSMITTER

TECHNICAL FIELD

The present disclosure relates to a radio control transmitter for performing remote control of a control target, e.g., various models (automobiles, motorcycles, aircraft, ships, and the like), a drone, an industrial machine such as a crane or the like, via wireless communication.

BACKGROUND

Conventionally, a radio control transmitter including a trigger for operating a throttle of an engine or a motor and a wheel for controlling steering of a control target is known as a radio control transmitter used mainly for operating a model car.

With an increase in the number of channels, such a radio control transmitter is provided with a plurality of switches for realizing various functions, in addition to the trigger and the wheel, to control the control target in a state similar to an actual operation.

The conventional radio control transmitter has various switches disposed at portions where fingers of a hand gripping a grip portion can reach, but does not have a switch that can be operated by remote control of the control target even when both hands are not free.

Therefore, in order to solve the above-described drawback, there is suggested a radio control transmitter, which is disclosed in Japanese Patent Application Publication No. 2015-213660, including a switch mechanism provided as a part of an outer peripheral portion extending in a width direction (short direction) of a base portion while facing an operator. In this radio control transmitter, a switch can be operated even when both hands are not free, e.g., even when one hand grips a grip portion and the other hand operates a trigger.

SUMMARY

Since, however, the switch mechanism of the radio control transmitter disclosed in Japanese Patent Application Publication No. 2015-213660 is provided as a part of the outer peripheral portion extending in the width direction (short direction) of the base portion while facing an operator, a third party cannot operate the switch mechanism. Therefore, when the operator is not an expert and the third party is an expert who assists the operation, for example, the expert cannot assist the operation of the switch mechanism without disturbing the operation of the operator.

In view of the above, the present disclosure provides a radio control transmitter in which a switch mechanism can be operated by a third party.

In accordance with an embodiment of the present disclosure, there is provided a radio control transmitter including a grip portion gripped by an operator at the time of performing remote control of a control target, a base portion disposed at one end of the grip portion, a head portion disposed at the other end of the grip portion and having an operating member configured to control the control target, wherein the radio control transmitter is configured to transmit a control signal to the control target in response to an operation of the operating member, and a switch mechanism including an operating member provided as a part of a surface of the base portion and at least one switch built in the base portion and configured to activate a pre-assigned function when the operating member is pressed.

In accordance with an embodiment of the present disclosure, the switch mechanism may be a seesaw type switch in which any one of two switches having individual functions and arranged side by side in a width direction of the base portion is pressed by one operating member extending in the width direction of the base portion.

In accordance with an embodiment of the present disclosure, the switch may include two switches having individual functions and arranged side by side in a width direction of the base portion, and the operating member may include two operating members disposed to face the two switches respectively.

In accordance with an embodiment of the present disclosure, a third party as well as an operator can operate the switch mechanism. Especially, when the operator is not an expert, a third party who is an expert can assist the operator by operating the switch of the switch mechanism.

BRIEF DESCRIPTION OF THE DRAWINGS

The objects and features of the present disclosure will become apparent from the following description of embodiments, given in conjunction with the accompanying drawings, in which.

DETAILED DESCRIPTION

Hereinafter, embodiments of the present disclosure will be described in detail with reference to the accompanying drawings.

A radio control transmitter (hereinafter, simply referred to as "transmitter") according to the present disclosure performs remote control of a control target, e.g., various models (automobiles, motorcycles, aircraft, ships, and the like), a drone, an industrial machine such as a crane or the like, by using a predetermined frequency band (e.g., 2.4 GHz band), determining a transmission frequency using a frequency hopping method that automatically selects an empty band of the frequency band, and transmitting to the control target a control signal (radio wave) corresponding to an operation of operating members (wheel and trigger) disposed at a housing.

In this example, a case where a transmitter performs remote control of a model car as a control target will be described as an example. Although it is assumed that an engine is used as a power source of the control target, a motor may be used as the power source.

<1. Configuration of Transmitter>

Figure 1:
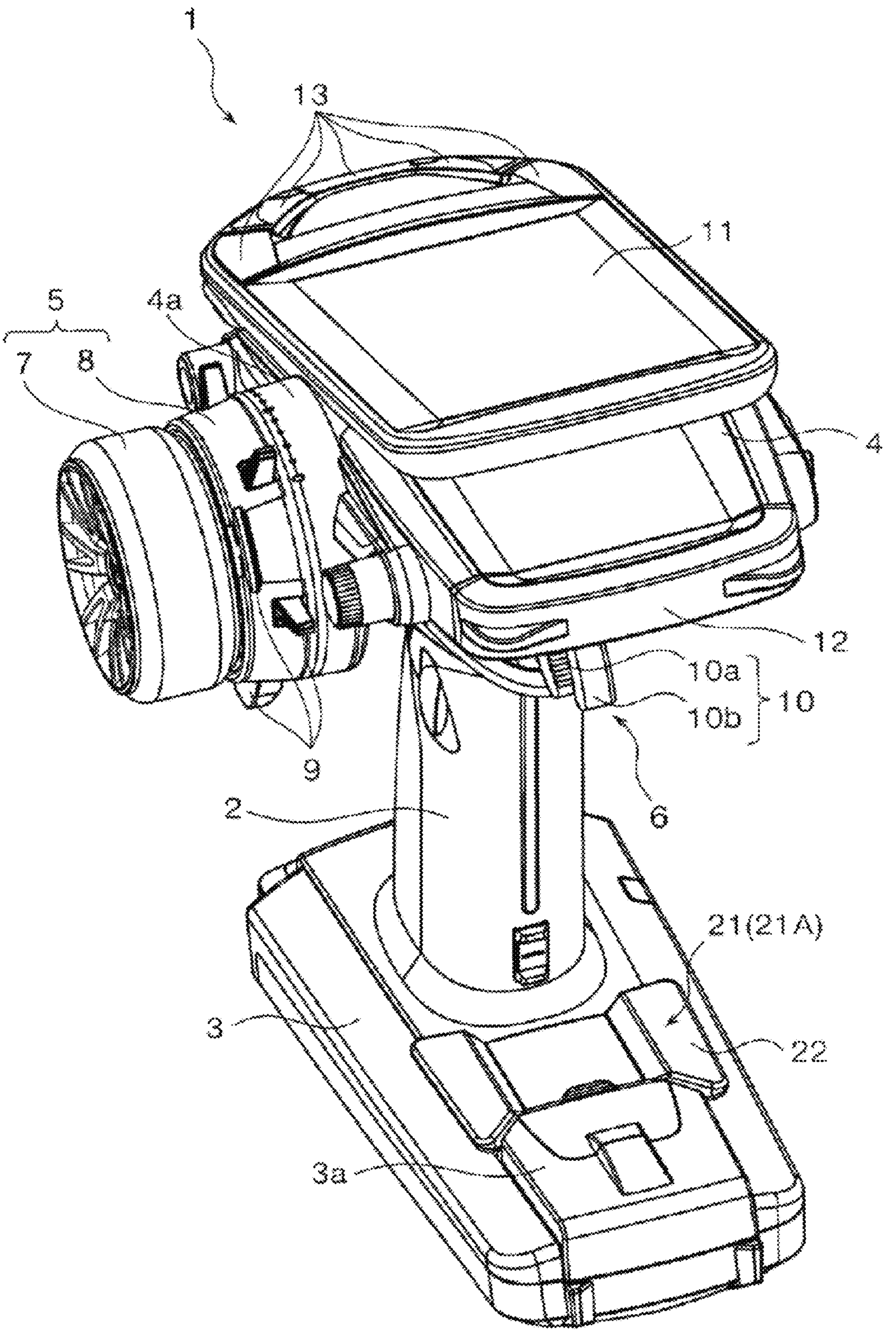
FIG. 1 is a perspective view showing an overall configuration of a radio control transmitter according to the present disclosure.
Figure 2:
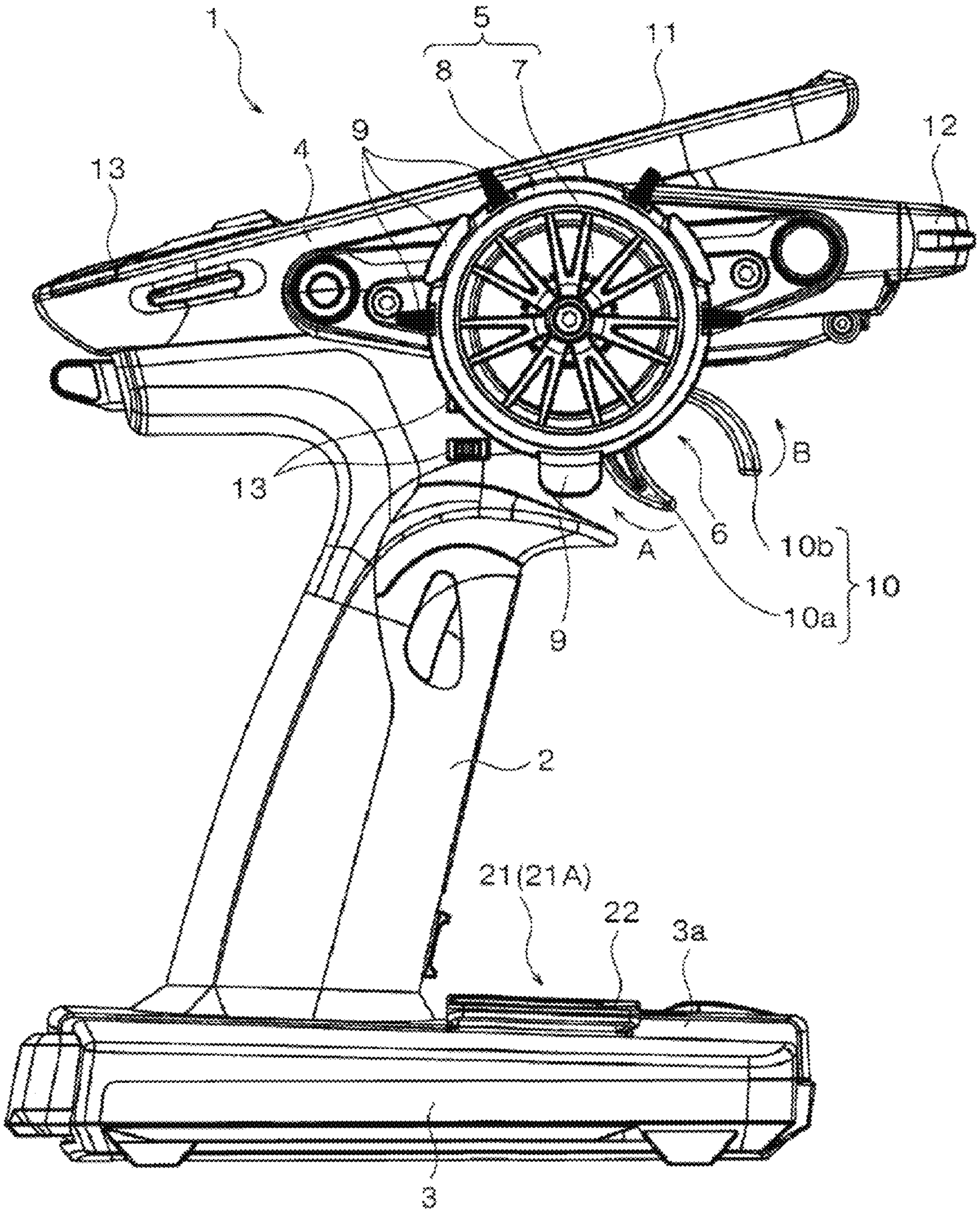
FIG. 2 is a side view showing the overall configuration of the radio control transmitter according to the present disclosure.

As shown in FIGS. 1 and 2, the transmitter 1 includes a grip portion 2, a base portion 3, and a head portion 4. A housing of each portion is made of a flexible thermoplastic resin (e.g., general-purpose plastic). As shown in FIG. 2, in the transmitter 1, the head portion 4, the grip portion 2, and the base portion 3 are arranged in that order from the top in a substantially Z shape.

<1-1. Grip Portion>

The grip portion 2 has one end (lower end of FIGS. 1 and 2) integrated with the base portion 3 and the other end (upper end of FIGS. 1 and 2) integrated with the head portion 4. The grip portion 2 has a thin elliptical columnar outer shape elongated from the base portion 3 toward the head portion 4. The grip portion 2 is gripped by an operator who performs remote control of the control target.

<1-2. Base Portion>

The base portion 3 is disposed at one end (lower end of FIGS. 1 and 2) of the grip portion 2, and has a rectangular shape. The base portion 3 prevents a hand gripping the grip portion 2 from slipping out of the grip portion 2 by restricting a lower limit position of the hand, and also functions as a leg having a bottom surface of a predetermined installation area when the transmitter 1 is not used and placed upright on the ground, for example.

<1-3. Head Portion>

The head portion 4 is disposed at the other end (upper end of FIGS. 1 and 2) of the grip portion 2, and includes a wheel unit 5 and a trigger unit 6 as operating units for controlling the control body.

Figure 3:
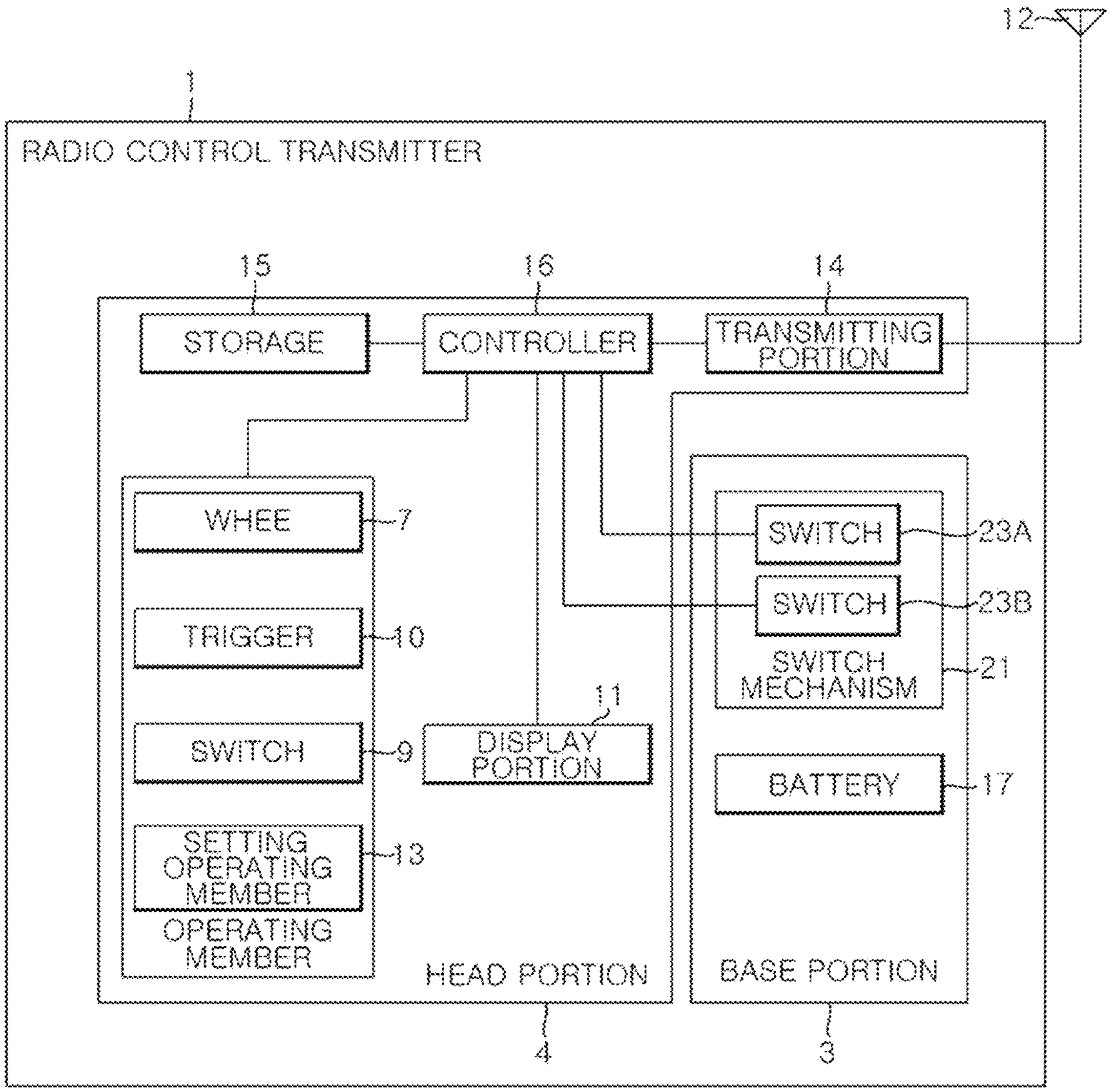
FIG. 3 is a block diagram showing an electrical configuration of the radio control transmitter according to the present disclosure.

In the wheel unit 5, a wheel (rotatable member) 7 is detachably attached to a main body fitting portion 4*a* of the head portion 4 via a switch operating member 8 on one side surface (right surface or left surface) of the head portion 4 depending on a dominant hand of an operator. FIGS. 1 to 3 show a case where the operator is right-handed.

The wheel 7 is an operating member as a steering for controlling a traveling direction of the control target. As shown in FIG. 2, the wheel 7 is supported at the main body fitting portion 4*a* attached to one side surface (right surface or left surface) of the head portion 4 via the switch operating member 8 by a rotation shaft whose center coincides with a center of a substantially disc-shaped surface and extending along the head portion 4 of the transmitter 1 in a direction perpendicular to the substantially disc-shaped surface. The wheel 7 is operated as a steering for controlling the traveling direction of the control target while rotating in a clockwise direction and a counterclockwise direction from a predetermined reference position.

A plurality of switches 9 such as a trim switch, a function switch, and the like are disposed at a cylindrical outer peripheral portion of the switch operating member 8, and an arbitrary function is assigned to each of the switches 9 by predetermined setting.

The trigger unit 6 is attached to the head portion 4 via a support member (not shown) that supports the trigger 10 to be rotatable.

The trigger 10 is an operating member for controlling a moving speed of the control target by controlling a power source of the control target. As shown in FIGS. 1 and 2, the trigger 10 has a trigger shape and is divided into a throttle lever 10*a* as a first lever and a brake lever 10*b* as a second lever. The trigger 10 is attached to the head portion 4 to be rotatable in the directions of arrows A and B of FIG. 2.

As shown in FIG. 2, the trigger 10 is rotatable in the direction of the arrow A of FIG. 2 to a position where the throttle lever 10*a* is brought into contact with a contact surface of a support member (not shown), and is rotatable in the direction of the arrow B of FIG. 2 to a position where the brake lever 10*b* is brought into contact with the contact surface of the support member (not shown).

The state of the throttle lever 10*a* shown in FIG. 2 is set to an initial position. The throttle lever 10*a* is supported to be rotatable to the rear side of the head portion 4 about the rotation shaft fixed to the head portion 4 near the upper end of the grip portion 2.

A base end portion of the brake lever 10*b* may be fixed to the throttle lever 10*a* by a screw to be detachable and replaceable. In this case, multiple types of brake levers 10*b*, e.g., one having a length or shape corresponding to a thickness of an operator's finger, one having a buffer such as sponge or foam on a surface to be in contact with a finger to protect the finger, and the like, may be prepared in advance and replaced depending on circumstances.

In general, the trigger 10 is operated by putting an index finger or a middle finger of a hand holding the grip portion 2 on the throttle lever 10*a* and pulling the throttle lever 10*a* in the direction of the arrow A, and is operated by pushing the brake lever 10*b* in the direction of the arrow B with the back of the finger put on the throttle lever 10*a*.

The trigger 10 automatically returns to the preset initial position (state shown in FIG. 2) when the finger on the throttle lever 10*a* is released. The initial position is referred to as "neutral position." At the neutral position, the engine of a control target is rotating, whereas the clutch thereof is disengaged, so that the control target is not traveling.

If the power source of the control target is a motor, the motor is not rotating at the neutral position.

The throttle of the engine of the control target is controlled by pulling the throttle lever 10*a* of the trigger in the direction of the arrow A of FIG. 2, thereby controlling the moving speed of the control target. The control target is accelerated as the throttle lever 10*a* of the trigger 10 is operated in the direction of the arrow A of FIG. 2.

The brake can be controlled by operating the brake lever 10*b* of the trigger 10 in the direction of the arrow B of FIG. 2. The brake lever 10*b* of the trigger 10 has a stronger force as it is operated in the direction of the arrow B of FIG. 2.

Depending on the settings of the transmitter 1, the control target may be moved backward by operating the brake lever 10*b* of the trigger 10 in the direction of the arrow B of FIG. 2. Further, even when a motor is used as the power source of the control target, the control target can be accelerated by operating the throttle lever 10*a* of the trigger 10 in the direction of the arrow A of FIG. 2.

The transmitter 1 is provided with a plurality of operating members, such as buttons and the like, in addition to the wheel 7 and the trigger 10. Special operations related to the operation of the control target can be assigned to these operating members.

Further, the head portion 4 is provided with a display portion 11 and an antenna 12. The display portion 11 is inclined at a predetermined angle with respect to the main body of the head portion 4 connected to the grip portion 2 so that an operator can easily see a display screen when the operator grips the grip portion 2. The display portion 11 is a display for displaying settings of the transmitter 1, and it is possible to switch display contents or change the settings of the transmitter 1 by operating a setting operating member 13, such as an operation button, a slide switch, or the like, disposed around the display portion 11.

The antenna 12 of the transmitter 1 in the present embodiment is rotatably supported at one end portion (i.e., an end portion of the head portion 4 which is opposite to an end portion facing an operator in a state where the corresponding operator grips the grip portion 2) of the head portion 4 which is opposite to a display surface of the display portion 11 in a state where an operator grips the grip portion 2. In the case of performing remote control of the control target, the antenna 12 is rotated by 90° from a horizontal state (state of FIG. 2) in which it integrally forms an outer shape with the head portion 4, and is used in an upright state in a vertical direction. The directivity at the time of performing remote control of the control target can be improved by using the antenna 12 in an upright state.

<1-4. Electrical Configuration>

As shown in FIG. 3, the head portion 4 has therein an electrical circuit including a transmitting portion 14, a storage 15, and a controller 16, in addition to the above-described display portion 11.

The base portion 3 is provided with a replaceable battery 17 for supplying a driving power required for individual components (the display portion 11, the transmitting portion 14, the storage 15, and the controller 16) of the electrical circuit.

The transmitting portion 14 modulates/amplifies transmission data generated by operating or setting the wheel 7 or the trigger 10, and transmits the modulated/amplified control signal to the control target via the antenna 12 under the control of the controller 16.

The storage 15 stores various setting information based on the operation of the setting operating member 13 under the control of the controller 16. Further, the storage 15 stores the functions assigned to various switches including the switches 9 and a switch 23 (23A and 23B) of switch mechanism (21A and 21B) to be described later in association with the switches by the setting operation of the setting operating member 13. Further, the storage 15 stores a control program for performing driving control of individual components of the transmitter 1.

The controller 16 performs overall control of the display portion 11, the transmitting portion 14, and the storage 15. The controller 16 performs the generation of the transmission data in response to the operation and setting of the wheel 7 and the trigger 10, the display control of the display portion 11, the output control of the control signal from the transmitting portion 14 via the antenna 12, the storage of the setting information in the storage 15, the control of reading out and executing a function corresponding a switch that outputs a contact signal inputted from various switches (the switches 9, the switch 23 (23A and 23B) of the switch mechanism 21 (21A and 21B) to be described later, and the like), the driving control of the individual components of the transmitter 1 based on the control program stored in the storage 15, or the like.

In the transmitter 1 configured as described above, an operator operates the trigger 10 while gripping the grip portion 2 with one hand and putting an index finger or a middle finger of the hand holding the grip portion 2 on the trigger 10, and operates the wheel 7 while holding the wheel 7 with the other hand. Then, the control signal corresponding to the operation of the trigger 10 and the wheel 7 is transmitted to the control target to perform the remote control the control target.

<2. Configuration of Switch Mechanism>

Next, a configuration of the switch mechanism 11, which is the main part of the present disclosure, will be described with reference to the accompanying drawings.

Figure 4:
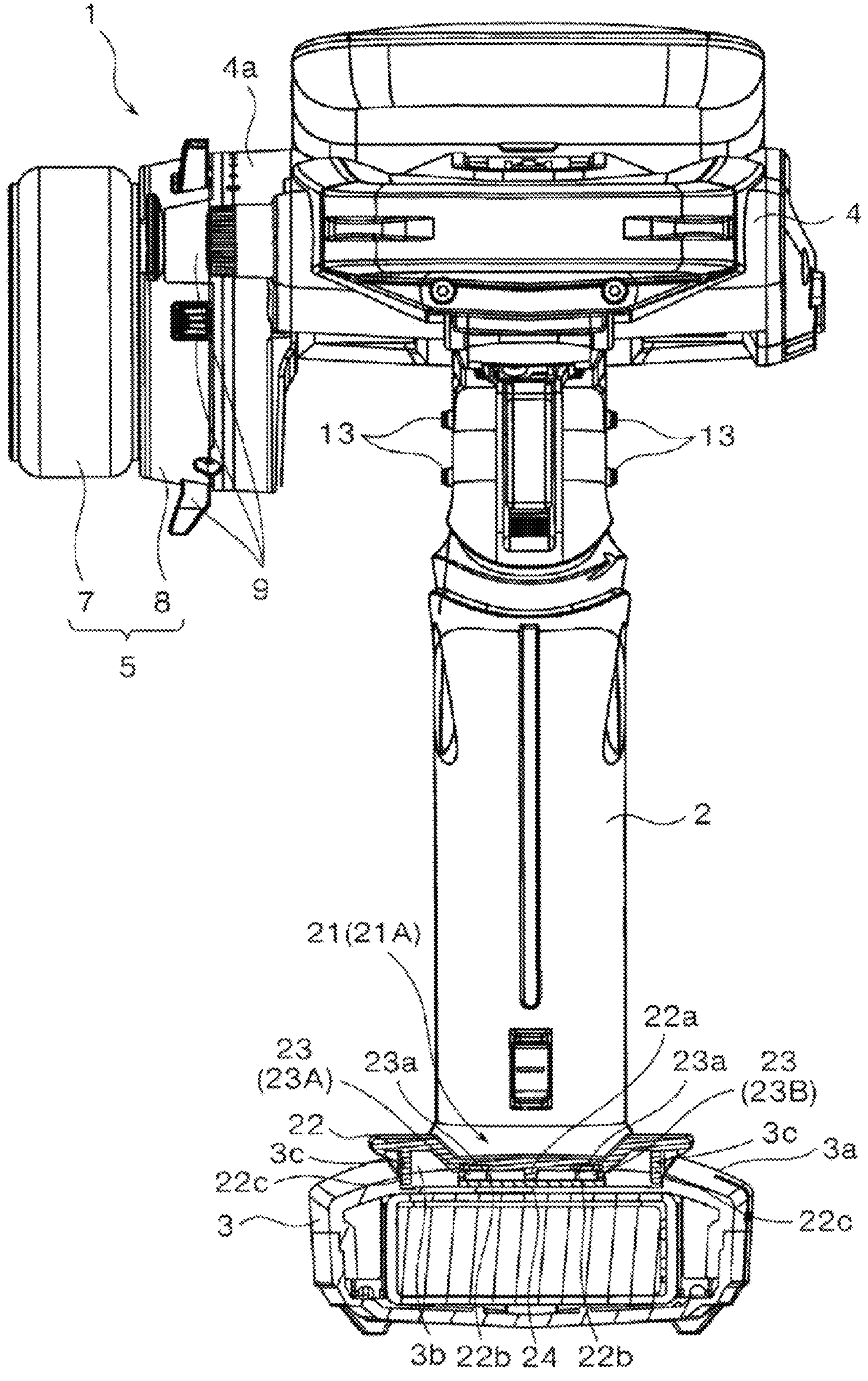
FIG. 4 shows an example of a switch mechanism of the radio control transmitter according to the present disclosure, and illustrates a cross-sectional view of the switch mechanism before operation.

As shown in FIG. 1, the switch mechanism 21 is disposed on a surface 3*a* of the base portion 3, and is operated by an operator or a third party. As shown in FIG. 4, the switch mechanism 21 includes an operating member 22 and the switch 23. The operating member 22 is disposed, as a part of the surface 3*a* of the base 3, at an opening 3*b* of the base portion 3. The switch 23 for activating the pre-assigned function is built in the base portion 3, closes the contact when the operating member 22 is pressed, and outputs a contact signal to the controller 16.

The operating member 22 has a large width extending in the width direction (depth direction of the paper surface of FIG. 2 and left-right direction of the paper surface of FIG. 4) of the base portion 3 near the base of the grip portion 2. Therefore, when an operator presses the operating member 22 of the switch mechanism 21A of FIG. 4 with a little finger of a hand holding the grip portion 2, the little finger can easily reach the operating member 22. At that time, the operating member 22 can be easily pressed by controlling the fitting position of the wheel 7 to be close to the surface 3*a* of the base portion 3 using an adapter disclosed in Japanese Patent Application Publication No. 2003-325994, which is a well-known technique.

The operating member 22 is bent in a plate shape. In order to protect the design, only both end portions of the operating member 22 in the width direction of the base portion 3 that are pressed by an operator or a third party protrude from the surface 3*a* of the base portion 3 by a predetermined amount (minimum stroke amount required to press the switch 23), and the other portions have a surface located on the same plane as the surface 3*a* of the base portion 3, as shown in FIG. 1.

A protrusion 22*a* is integrally formed at the center of the rear surface of the operating member 22 in the length direction of the base portion 3 (the depth direction of the paper surface of FIG. 4). As shown in FIG. 4, the protrusion 22*a* has an arc-shaped tip end to be in contact with the surface of a substrate 24 on which the switch 23 is disposed. As shown in FIG. 4, in the operating member 22, a recess 22*b* is formed at each of two positions spaced apart from the protrusion 22*a* by the same distance in the width direction of the base portion 3 (the left-right direction of the paper surface of FIG. 4), and a rib 22*c* that is move up and down along an inner wall surface 3*c* around the opening 3*b* of the base portion 3 is formed on each of both sides of the rear surface of the operating member 22 with respect to the protrusion 22*a*.

The switch 23 is wire connected to the substrate 24 built in and fixed to the base portion 3, and includes two tact switches 23A and 23B in which operating portions 23*a* are located in the recesses 22*b* of the operating member 22, respectively, and arranged side by side in the width direction of the base portion 3.

Figure 5:
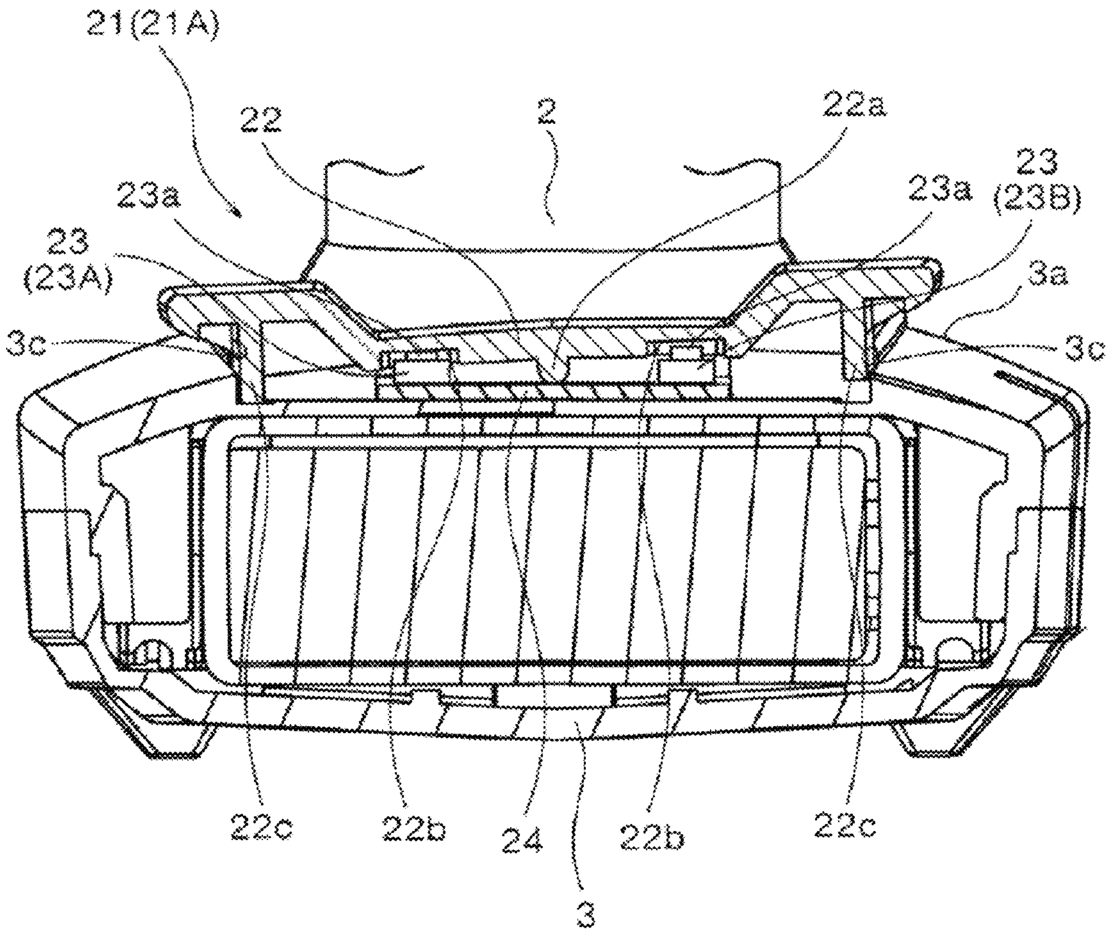
FIG. 5 is a partially enlarged cross-sectional view during an operation of the switch mechanism of FIG. 4.

In the switch mechanism 21A, when an operator or a third party presses the left portion of the operating member 22 in the width direction of the base portion 3 at the neutral position of FIG. 4, the left portion of the operating member 22 in the width direction of the base portion 3 is lowered with respect to the protrusion 22*a* and, thus, the operating portion 23*a* in the recess 22*b* is pressed, as shown in FIG. 5. Accordingly, the contact of the switch 23A is closed, and a contact signal is outputted to the controller 16. When the contact signal is inputted from the switch 23A, the controller 16 reads out the function assigned to the switch 23A that has outputted the contact signal from the storage 15, and performs control for executing the read-out function.

On the other hand, in the switch mechanism 21A, when an operator or a third party presses the right portion of the operating member 22 in the width direction of the base portion 3 at the neutral position of FIG. 4, the right portion of the operating member 22 in the width direction of the base portion 3 is lowered with respect to the protrusion 22*a* and, thus, the operating portion 23*a* in the recess 22*b* is pressed. Accordingly, the contact of the switch 23B is closed, and a contact signal is outputted to the controller 16. When the contact signal is inputted from the switch 23B, the controller 16 reads out the function assigned to the switch 23B that has outputted the contact signal from the storage 15, and performs control for executing the read-out function.

When the pressing of the operating member 22 is released, the contact is opened by the repulsive force of the switches 23A and 23B, and the operating portions 23*a* of the switches 23A and 23B return to the neutral position of FIG. 4.

As described above, in the switch mechanism 21A of FIG. 4, a seesaw type switch is used, so that one of the two switches 23A and 23B is operated with respect to the protrusion 22*a* to output the contact signal to the controller 16 when the operating member 22 is pressed by an operator or a third party. The controller 16 performs control for executing the function pre-assigned to the switch that has outputted the contact signal.

As described above, in the switch mechanism 21A, the operating member 22 has a large width in the width direction of the surface 3*a* of the base portion 3, so that a third party can operate the operating member 22 without disturbing the operation of an operator both when the operator grips the grip portion 2 with a left hand and operates the wheel 7 with a right hand in a state where the outer peripheral surface of the wheel 7 faces the operator and when the operator grips the grip portion 2 with a left hand and operates the wheel 7 with a right hand in a state where the circular surface of the wheel 7 faces the operator. Accordingly, when the operator is not an expert, for example, an expert who is a third party can assist the operator by controlling the switch mechanism 21A to realize the functions pre-assigned to the switches 23A and 23B without disturbing the control of the operator.

Figure 6:
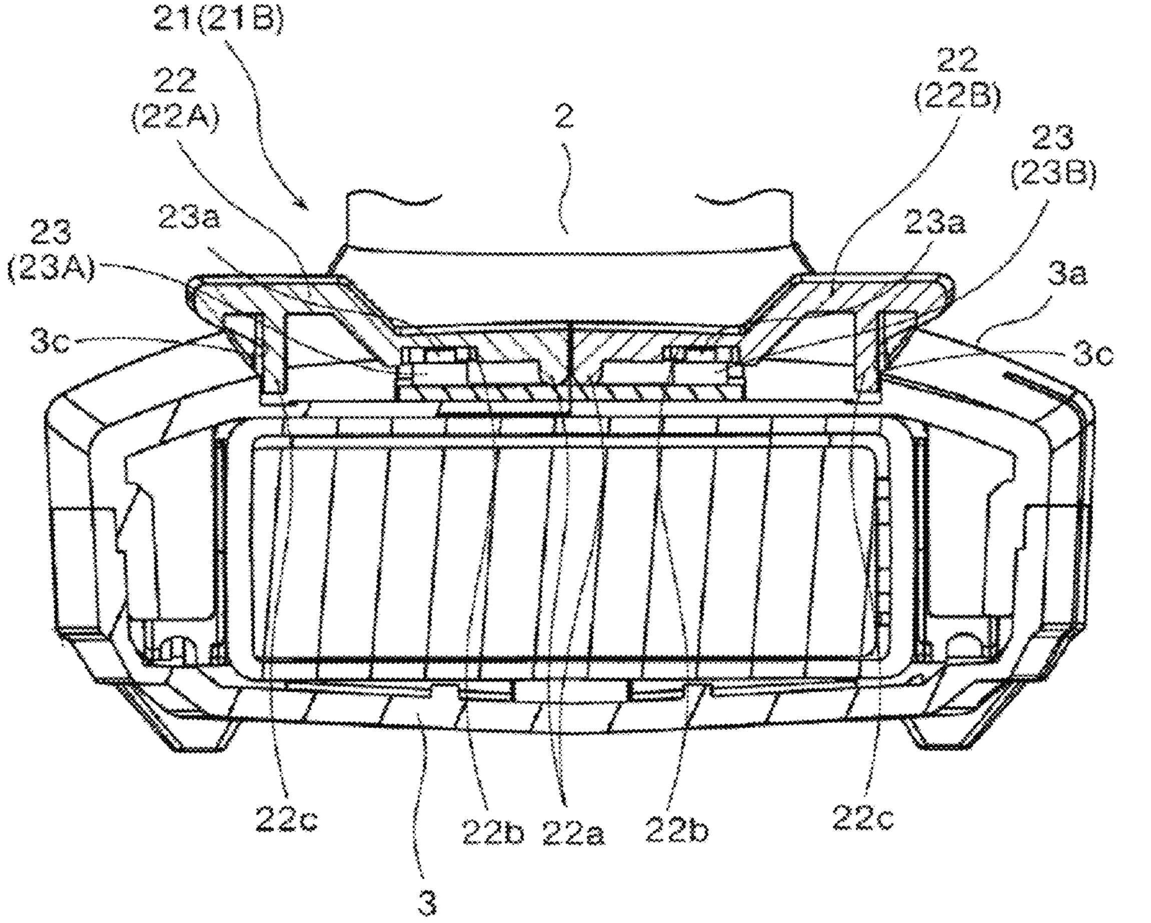
FIG. 6 is a partially enlarged cross-sectional view showing another configuration example of the switch mechanism.

The switch mechanism 21A does not necessarily have the configuration using the seesaw type switch shown in FIGS. 4 and 5. For example, it is also possible to employ the switch mechanism 21B in which the two switches 23A and 23B having individual functions are arranged side by side in the width direction of the base portion 3 and wire connected to the substrate 24, and operating members 22A and 22B are disposed to face the two switches 23A and 23B, respectively, as shown in FIG. 6. In other words, the switch mechanism 21B has the configuration in which the operating member 22 of the seesaw type switch shown in FIG. 4 is divided into the two operating members 22A and 22B, and the switches 23A and 23B are disposed to face the divided operating members 22A and 22B, respectively.

In the switch mechanism 21B, when an operator or a third party presses the operating member 22A at the neutral position of FIG. 6, the left portion of the operating member 22A in the width direction of the base portion 3 is lowered with respect to the protrusion 22*a* and, thus, the operating portion 23*a* in the recess 22*b* is pressed. Accordingly, the contact of the switch 23A is closed, and a contact signal is outputted to the controller 16. When the contact signal is inputted from the switch 23A, the controller 16 reads the function assigned to the switch 23A that has outputted the contact signal from the storage 15, and performs control for executing the read-out function.

On the other hand, in the switch mechanism 21B, when an operator or a third party presses the operating member 22B at the neutral position of FIG. 6, the right portion of the operating member 22B in the width direction of the base portion 3 is lowered with respect to the protrusion 22*a* and, thus, the operating portion 23*a* in the recess 22*b* is pressed. Accordingly, the contact of the switch 23B is closed, and a contact signal is outputted to the controller 16. When the contact signal is inputted from the switch 23B, the controller 16 reads the function assigned to the switch 23B that has outputted the contact signal from the storage 15, and performs control for executing the read-out function.

In the switch mechanism 21B of FIG. 6, like reference numerals will be used for like parts having the same functions as those of the switch mechanism 21A of FIG. 4.

The switch mechanism 21 does not necessarily have the illustrated configuration, and may have a configuration in which one operating member 22 has a large width extending in the width direction of the base portion 3 (the depth direction of the paper surface of FIG. 2 and the left-right direction in the paper surface of FIG. 4) near the base of the grip portion 2, and one switch 23 having a pre-assigned function is disposed to correspond to the one operating member 22.

The functions assigned to the switches 23A and 23B of the switch mechanism 21 (21A and 21B), such as on/off of a gimmick operation, switching of conditions, on/off of a lap timer for counting the number of laps, on/off of a turbo function, mixing, emergency braking, a camera, and the like, may be randomly set by an operator. For example, when functions that are desired by an operator during a two-handed operation are assigned to the switches 23A and 23B, the operator can quickly decide to operate the switch mechanism 21 at the time of emergency, and the functions assigned to the switches 23A and 23B of the switch mechanism 21 can be activated immediately. When an operator is not an expert, a third party who is an expert can assist the operator by operating the switch mechanism 21 to activate the functions assigned to the switches 23A and 23B of the switch mechanism 21.

The transmitter 1 of the present embodiment has the configuration including the operating member 22 having a large width in the width direction of the surface 3*a* of the base portion 3 near the base of the grip portion 2, and the switch mechanism 21 (21A and 21B) including the switch 23 that activates a pre-assigned function when the operating member 22 is pressed, so that a third party as well as an operator can operate the switch mechanism 21. Accordingly, when the operator is not an expert, a third party who is an expert can assist the operator by operating the switch mechanism 21 to activate the functions assigned to the switches 23A and 23B of the switch mechanism 21.

In the case of employing the switch mechanism 21B of FIG. 6, the switch operation suitable for the dominant hand of an operator can be performed due to the configuration in which the two switches 23A and 23B that can be individually operated by the operating members 22A and 22B are arranged side by side in the width direction of the base portion 3. In other words, when an operator who is right-handed grips the grip portion 2 with a left hand and operates the wheel 7 with a right hand, the switch 23A can be operated with the little finger of the right hand and the switch 23B can be operated with the little finger of the left hand. On the other hand, when an operator who is left-handed grips the grip portion 2 with a right hand and operates the wheel 7 with a left hand, the switch 23B can be operated with the little finger of the left hand and the switch 23A can be operated with the little finger of the right hand.

Since the switch mechanism 21 accommodating the heavy battery 17 is disposed at the base portion 3 located at the lower part during the operation of the transmitter 1, the balance of the entire transmitter 1 is maintained.

While the best mode of the transmitter of the present disclosure has been described, the present disclosure is not limited by the description and the drawings thereof. In other words, other embodiments, examples, operational technologies, and the like that are conceived by those skilled in the art are all included in the scope of the present disclosure.

The invention claimed is:

1. A radio control transmitter comprising:

a grip portion gripped by an operator at the time of performing remote control of a control target;

a base portion disposed at one end of the grip portion;

a head portion disposed at the other end of the grip portion and having an operating member configured to control the control target, wherein the radio control transmitter is configured to transmit a control signal to the control target in response to an operation of the operating member; and a switch mechanism including an operating member provided as a part of a surface of the base portion and at least one switch built in the base portion and configured to activate a pre-assigned function when the operating member is pressed, wherein the surface of the base portion is a surface facing a bottom of the head portion.

2. The radio control transmitter of claim 1, wherein the switch mechanism is a seesaw type switch in which any one of two switches having individual functions and arranged side by side in a width direction of the base portion is pressed by one operating member extending in the width direction of the base portion.

3. The radio control transmitter of claim 1, wherein the switch includes two switches having individual functions and arranged side by side in a width direction of the base portion, and the operating member includes two operating members disposed to face the two switches respectively.

* * * * *